United States Patent
Burger (10) Patent No.: US 9,987,815 B2
(45) Date of Patent: Jun. 5, 2018

(54) METHOD FOR PRODUCTION OF A COMBUSTION CHAMBER TUBE FOR RESTRAINT SYSTEMS IN VEHICLES AND DEVICE FOR IMPLEMENTATION OF THE METHOD

(71) Applicant: Familie Burger GbR, Nesselwang (DE)

(72) Inventor: Manuel Burger, Hamburg (DE)

(73) Assignee: FAMILIE BURGER GBR, Nesselwang (DE)

(*) Notice: Subject to any disclaimer, the term of this patent is extended or adjusted under 35 U.S.C. 154(b) by 0 days. days.

(21) Appl. No.: 15/371,344

(22) Filed: Dec. 7, 2016

(65) Prior Publication Data
US 2017/0157877 A1    Jun. 8, 2017

(30) Foreign Application Priority Data
Dec. 8, 2015  (DE) .......................... 10 2015 121 326

(51) Int. Cl.
| | |
|---|---|
| B21D 7/04 | (2006.01) |
| B30B 7/04 | (2006.01) |
| B21D 41/02 | (2006.01) |
| B21D 41/04 | (2006.01) |
| B60R 21/264 | (2006.01) |
| B21D 17/02 | (2006.01) |
| B21D 19/00 | (2006.01) |

(52) U.S. Cl.
CPC ................ *B30B 7/04* (2013.01); *B21D 17/02* (2013.01); *B21D 19/005* (2013.01); *B21D 41/02* (2013.01); *B21D 41/026* (2013.01); *B21D 41/04* (2013.01); *B60R 21/264* (2013.01); *B60Y 2410/12* (2013.01)

(58) Field of Classification Search
CPC ........ B21D 7/04; B21D 17/02; B21D 39/048; B21D 41/026
USPC ................................ 72/370.01, 370.04, 402
See application file for complete search history.

(56) References Cited

U.S. PATENT DOCUMENTS

| | | | |
|---|---|---|---|
| 3,370,451 A * | 2/1968 | Schuetz .................... | B21C 5/00 72/402 |
| 5,634,367 A * | 6/1997 | Yamada ................. | B21D 15/02 72/370.01 |
| 2008/0229803 A1* | 9/2008 | Yamawaki ............. | B21D 17/02 72/360 |

* cited by examiner

*Primary Examiner* — Debra Sullivan
(74) *Attorney, Agent, or Firm* — Paul D. Bianco; Gary S. Winer; Fleit Gibbons Gutman Bongini & Bianco PL (57) ABSTRACT

A method and device for production of a combustion chamber tube for restraint systems in vehicles. The combustion chamber tube is embossed by several embossing dies arranged stellate around the combustion chamber tube and movable by an annular compression module with several punches movable in synchronized fashion in the radial direction and two inner punches extending into the ends of the combustion chamber tube, each with a support mandrel and a shaping mandrel movable relative to support mandrel. The combustion chamber tube is embossed from the outside by the embossing dies radially movable via punches against the support mandrels and the ends of the combustion chamber tube are shaped by shaping mandrels movable relative to support mandrels when the embossing dies are closed.

14 Claims, 6 Drawing Sheets

METHOD FOR PRODUCTION OF A COMBUSTION CHAMBER TUBE FOR RESTRAINT SYSTEMS IN VEHICLES AND DEVICE FOR IMPLEMENTATION OF THE METHOD

FIELD OF THE DISCLOSURE

The disclosure concerns a method for production of a combustion chamber tube for restraint systems in vehicles and a device for implementation of the method.

BACKGROUND

Combustion chamber tubes are used to accommodate the propellant charge for airbags, belt pre-tensioning systems or other restraint systems in vehicles. These are ordinarily produced from tubular initial parts on which various crimping, embossing, sizing and stamping processes are conducted. This machining ordinarily occurs in special-purpose hydraulic machines in which the individual work steps are separate from each other, which can lead to synchronization and quality problems. The production rate is also restricted.

SUMMARY

A method and device for production of a combustion chamber tube for restraint systems in vehicles that permit rapid and precise processing are disclosed.

Expedient modifications and advantageous embodiments are also disclosed.

The combustion chamber tube in the method according to the disclosure is embossed by several embossing dies arranged stellate around the combustion chamber tube and movable by a ring press module with several punches movable in the radial direction in synchronized fashion and two internal punches extending into the ends of the combustion chamber tube, each with a support mandrel and a shaping mandrel movable relative to the support mandrel. The combustion chamber tube is embossed from the outside by the embossing dies movable radially over the punches against the support mandrel, and the ends of the combustion chamber tube are shaped by the shaping mandrels guided by the support mandrels when the embossing dies are closed.

Shaping of the outside can also occur through concentric embossing movements, so that high precision is attainable. Deformation of the tube ends with embossing of internal holds and sizing of the tube ends can also occur if the combustion chamber tube is fully enclosed by the embossing dies arranged around the combustion chamber tube, so that precise shaping can also be achieved with improved accuracy.

In an expedient embodiment, the support mandrels can be moved into an embossing position by an adjustment device before the embossing dies are brought together, and the shaping mandrels can be moved relative to the support mandrels after the embossing dies are brought together.

In a subsequent processing step, the combustion chamber tube can be stamped by stamping dies with a cutting sleeve extending into the combustion chamber tube and several cutting punches arranged stellate around the combustion chamber tube and radially movable in a guide sleeve. Here again, the cutting punches arranged uniformly around the combustion chamber tube can be simultaneously moved, for example, by a ring press module with several punches arranged around the combustion chamber tube and movable in synchronized fashion in the radial direction, so that self-centering and precise machining is made possible.

A device according to the disclosure is characterized by a ring press module with several punches arranged around the combustion chamber tube and movable in synchronized fashion by a control element in the radial direction and by adjustment devices for axial displacement of two inner punches extending into both ends of the combustion chamber tube, in which case the inner punches each contain a support mandrel and a shaping mandrel movable relative to the support mandrel.

Corresponding holding elements in an advantageous embodiment can be provided on the punches of the ring press module for releasable holding of several embossing dies arranged around the combustion chamber tube. The embossing dies can be arranged on a common support plate for simple changeover. The changeover times can thereby be reduced.

The adjustment devices expediently contain a slide movable on a lower frame in the longitudinal direction of the combustion chamber tube with a horizontal support on which the support mandrels and shaping mandrels are arranged.

The control element for radial displacement of the punches in another advantageous embodiment can be intermittently rotated by a reciprocating link driven with an eccentric drive. The reciprocating link in one possible variant has an annular bottom part mounted to rotate on a frame via a bearing arrangement to accommodate the annular control element and an upward protruding arm to engage with an eccentric drive pin of a shaft driven by a motor.

The device can also have a ring press module with several punches arranged around the combustion chamber tube and movable in synchronized fashion by a control element in the radial direction to operate a punching die with several cutting punches arranged stellate around the combustion chamber tube and movable radially in a guide sleeve. Punching operations on the combustion chamber tube can also thereby be conducted. The cutting punches with the guide sleeve and a corresponding cutting sleeve can also be arranged on a common support plate for simple changeover.

BRIEF DESCRIPTION OF THE DRAWINGS

Additional details and advantages of the invention are apparent from the following description of a preferred embodiment example with reference to the drawings. In the drawings.

DETAILED DESCRIPTION

Figure 1:
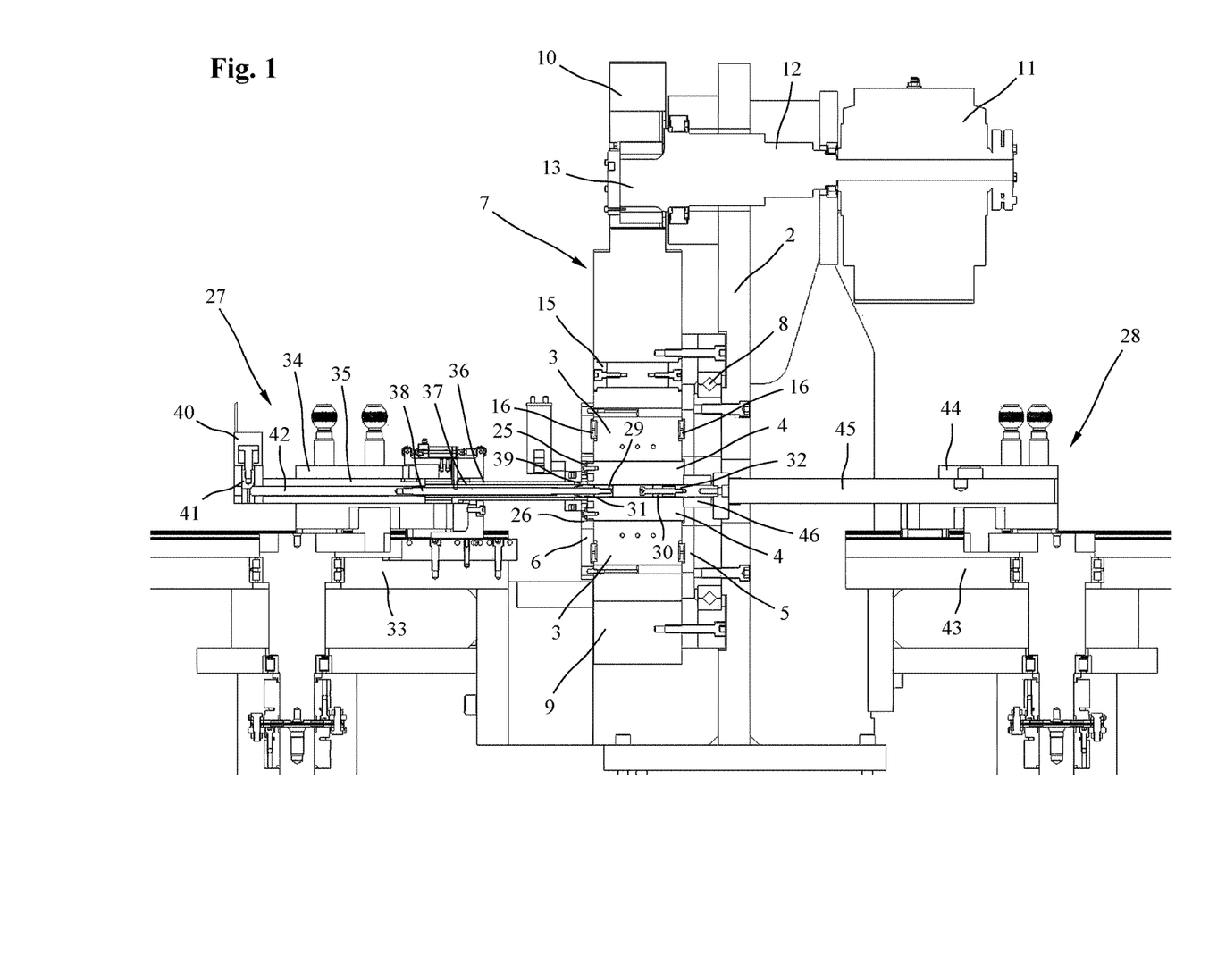
FIG. 1 shows a device for production of combustion chamber tubes in a side view.
Figure 4:
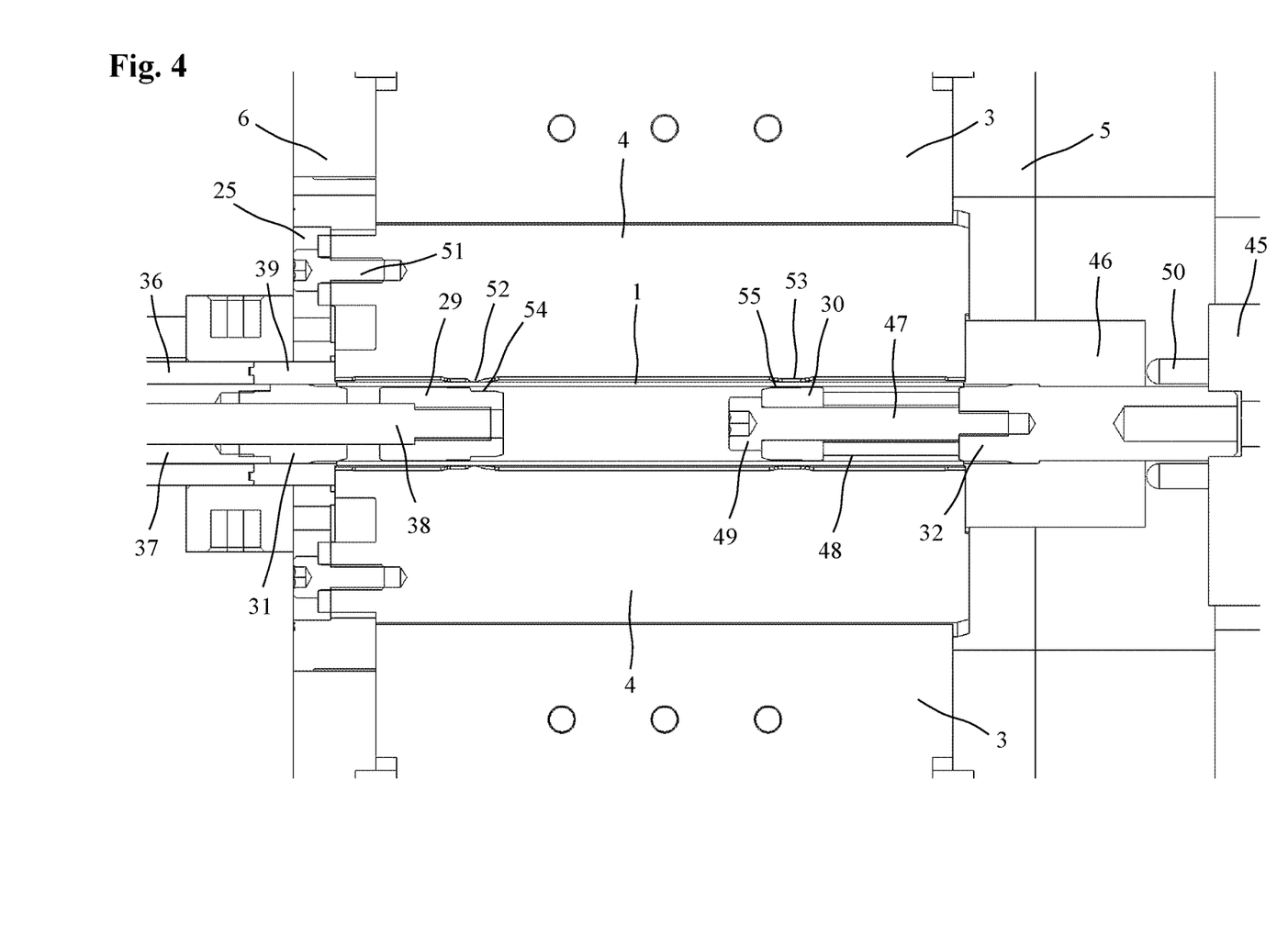
FIG. 4 shows a first machining step for production of a combustion chamber tube.
Figure 5:
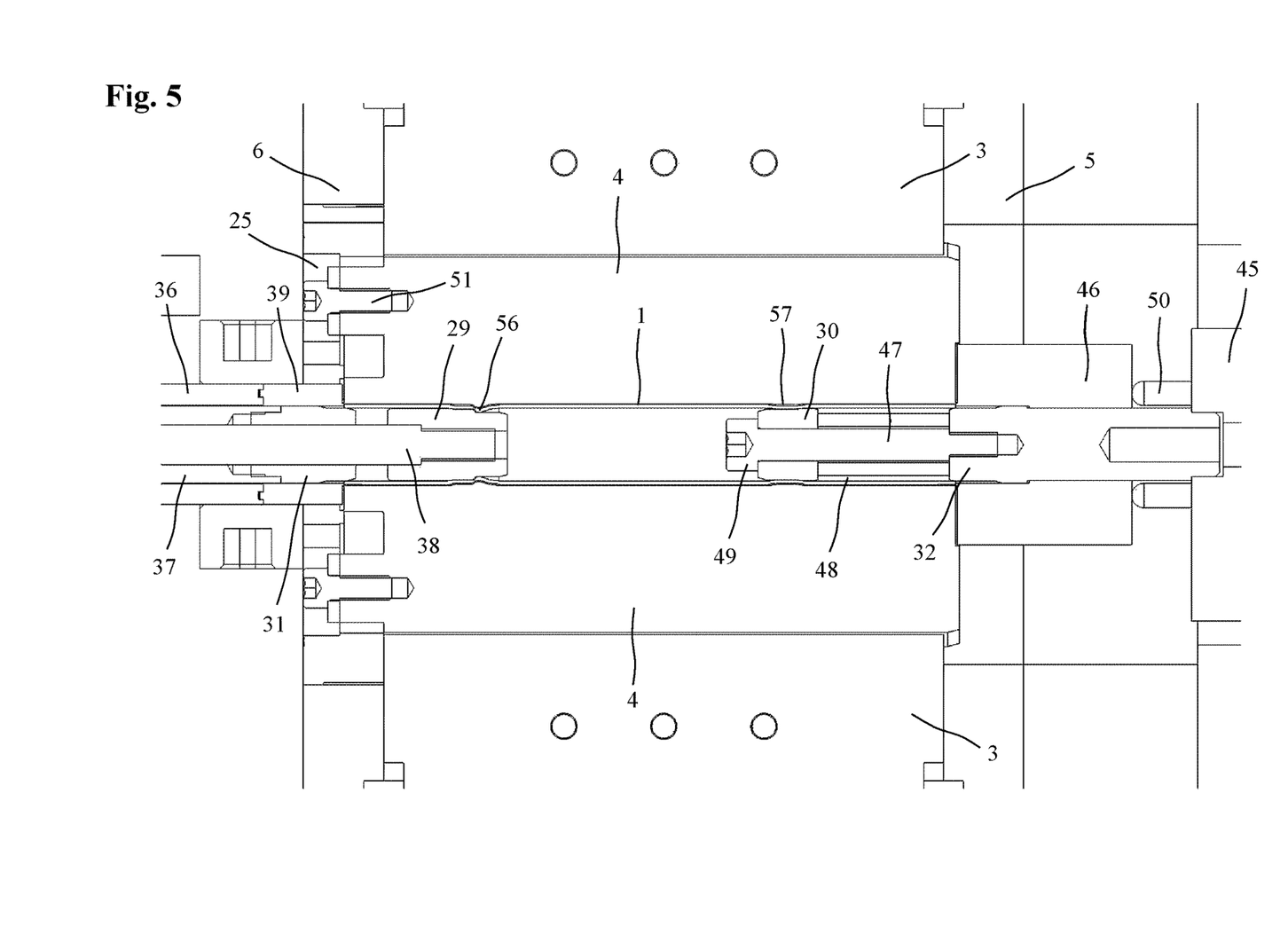
FIG. 5 shows a second machining step for production of a combustion chamber tube and FIG. 6 shows a third machining step for production of a combustion chamber tube.
Figure 6:
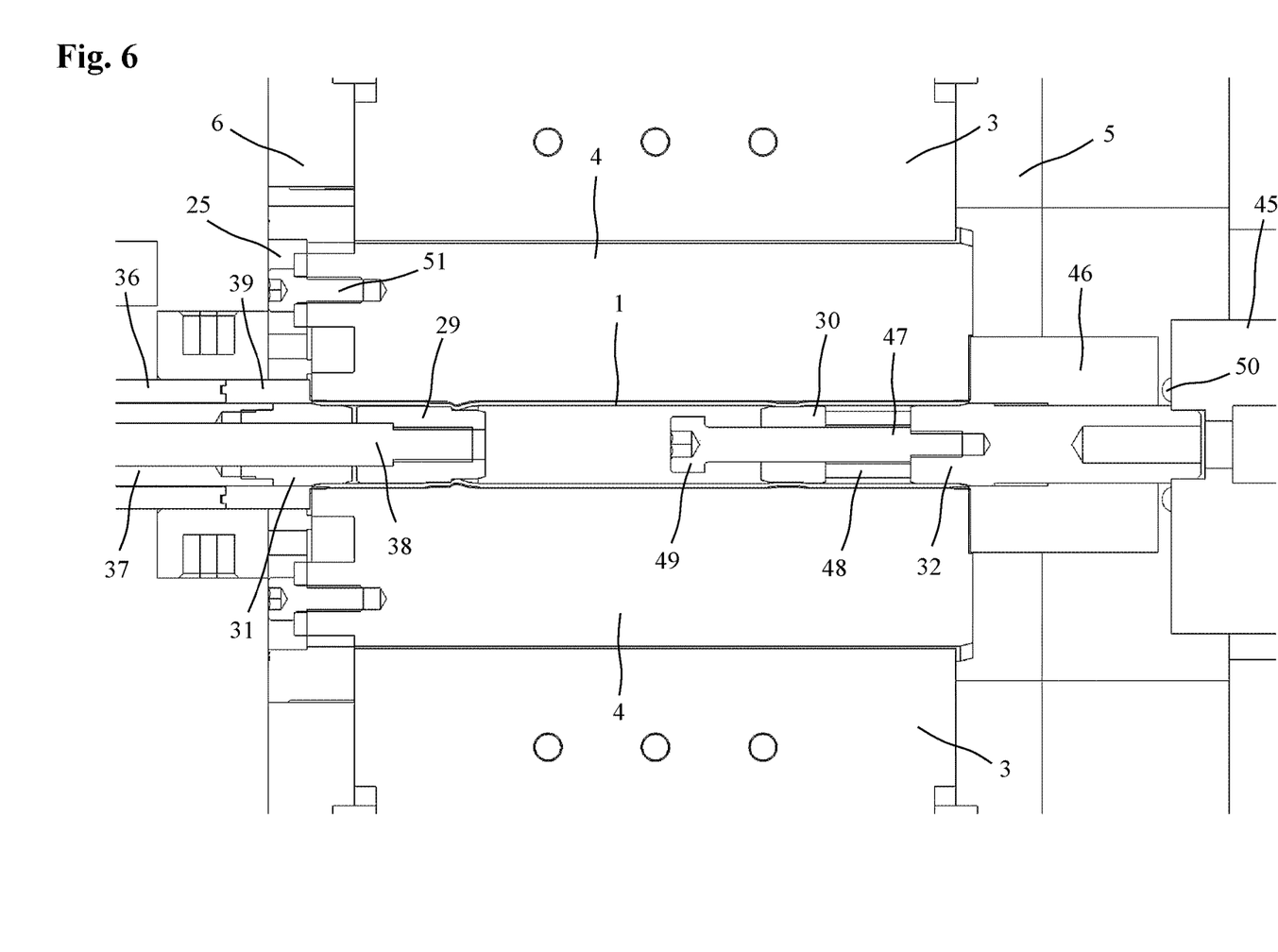

A device for production of a combustion chamber tube 1 depicted in FIGS. 4 to 6 for restraint systems in vehicles is shown in FIG. 1 in a side view. The device schematically depicted in FIG. 1 contains a frame 2, on which several punches 3, arranged stellate and movable inward and outward in synchronized fashion by a reciprocating drive in the radial direction, are arranged with radially movable embossing dies 4 arranged releasably on them. The punches 3 are guided to move radially between a rear guide plate 5 fastened to frame 2 and a front guide plate 6 spaced from the rear guide plate 5 via spacer sleeves.

The reciprocating drive contains a reciprocating link 7 with an annular bottom part 9 mounted to rotate on frame 2 via a bearing arrangement 8 and an upward protruding arm 10, through which the reciprocating link 7 can be moved back and forth by a stipulated angular range via an eccentric drive for intermittent rotation of the annular bottom part 9. The eccentric drive includes a shaft 12 mounted to rotate in frame 2 and driven by a motor 11, which contains an eccentric drive pin 13 cooperating with the arm 10 of the reciprocating link 7 for back-and-forth movement. An annular control element 14, also depicted in FIG. 2, is arranged in the annular bottom part 9 of the reciprocating link 7, which is connected to the reciprocating link 7 via a driver 15 and can be rotated back and forth via the reciprocating link 7 in a stipulated angular range.

A ring press module, through which the embossing dies 4 can be moved to perform concentric crimping, embossing and sizing operations or also cutting punches to perform punching operations with high machining accuracy, is created by the control element 14 rotatable via the reciprocating link 7 and the punch 3 movable radially inward by the control element 14 and radially outward again by means of return spring 16 or other return elements.

Figure 2:
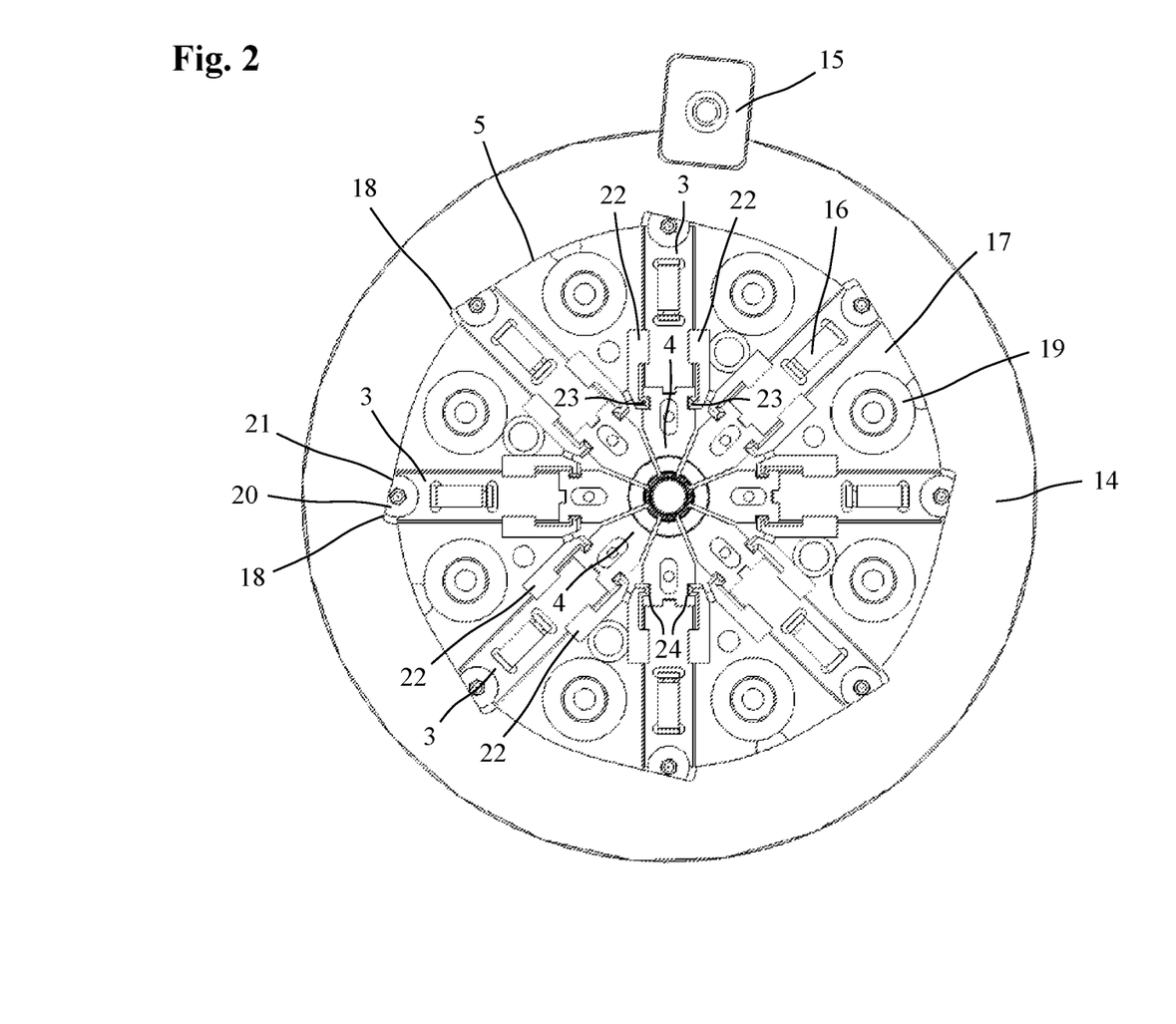
FIG. 2 shows a ring press module of the device depicted in FIG. 1 in a front view.

A front view of a ring press module for carrying out embossing operations is shown in FIG. 2, in which the front die plate 6 here is removed. It is apparent from this depiction that the punches 3 arranged stellate within the annular control element 14 are guided to move radially between guide elements 17 in the form of circular segments. The guide elements 17 are arranged on the inside of the rear guide plate 5, visible here and also on the inside of the front guide plate 6, which is omitted here. It is also apparent in this depiction that the annular control element 14 contains several oblique control surfaces 18 distributed over the periphery on its inside. The spacer sleeves 19 are also apparent, via which the front guide plate 6 and the rear guide plate 5 are kept at a spacing from each other.

It is also apparent from FIG. 2 that compression elements 20 lying against the control surfaces 18 of the annular control element 14 are arranged on the outer ends of the radially movable punches 3. The compression elements 20 contain an oblique surface 21 lying against the oblique control surfaces 18 of the annular control element 14. A type of cam drive is formed by the compression elements 20 with the oblique surfaces 21 and the annular control element 14 with the oblique control surfaces 18, through which the punches 3 can be moved in mechanically synchronized fashion inwardly in the radial direction during rotation of the annular control element 14 with the embossing dies 4 arranged on them. Return of the punches 3 occurs through return spring 16. The punches have clamp-like holding elements 22 on their radially inner end for releasable holding of the embossing dies 4. The clamp-like holding elements 22 contain inwardly protruding holding tabs 23 for engagement in lateral holding grooves 24 of the embossing dies 4. The embossing dies 4 can thus be pushed in laterally.

Figure 3:
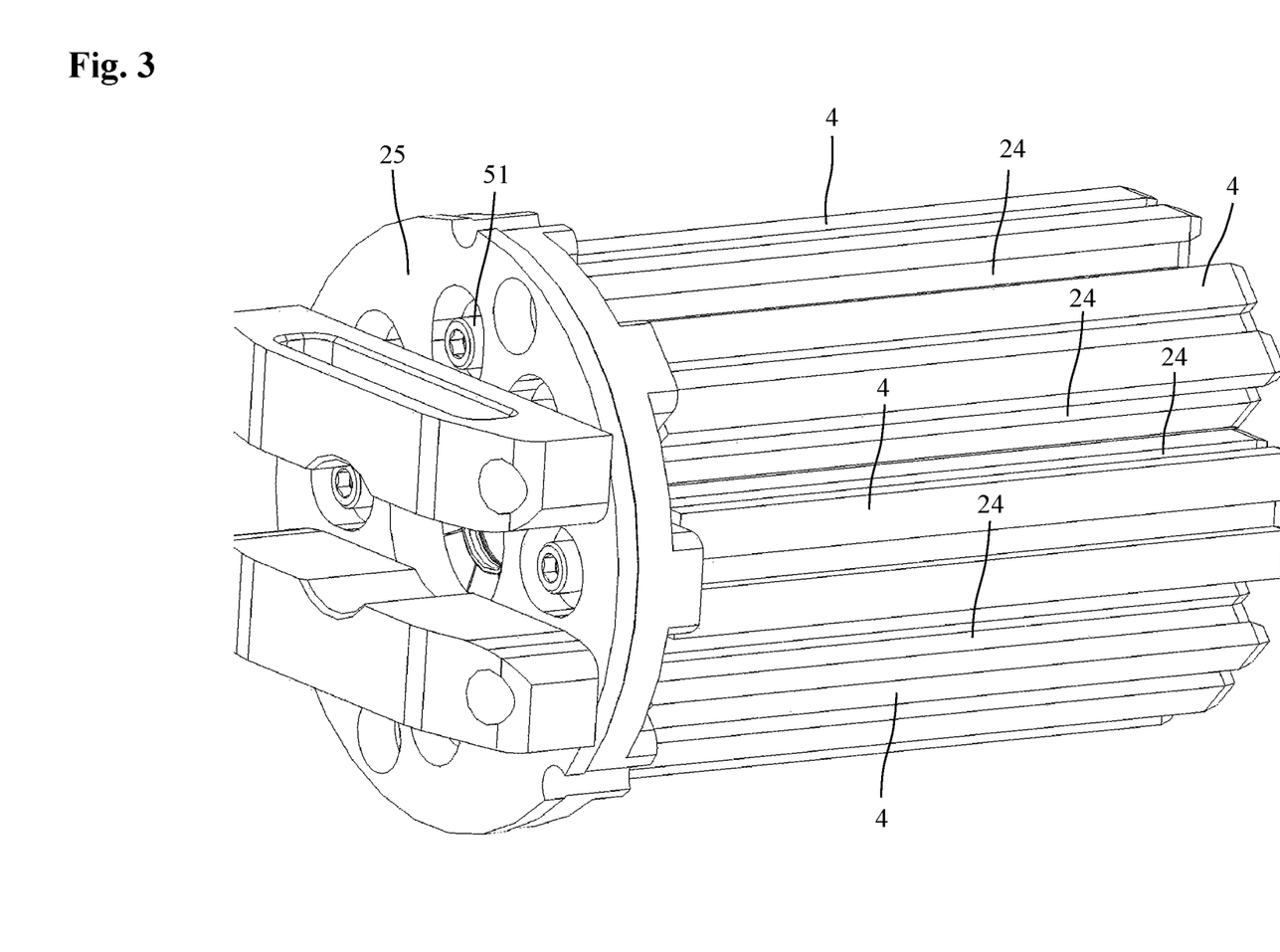
FIG. 3 shows a support plate with embossing dies fastened to it.

For simpler changeover, the embossing dies 4 according to FIG. 3 provided with lateral holding grooves 24 are mounted with one end on a common support plate 25. The embossing dies 4 are mounted on the support plate 25, so that they can execute the radial embossing movement, but are sufficiently secured in order to be simply replaced by disassembly or assembly of support plate 25. The support plate 25 with the embossing dies 4 freely protruding laterally is fastened according to FIG. 1 in a corresponding mount 26 in the front guide plate 5. By disassembly of support plate 25, all of the embossing dies 4 can thus be simultaneously pulled out between the clamp-like holding elements 25 of punches 3 and replaced by other embossing dies or other dies. Simple changeover of the device with other embossing dies or other dies can thereby occur.

The device depicted in FIG. 1, in addition to the ring press module with the punches 3 arranged stellate around the combustion chamber tube 1 and movable radially and the embossing dies 4 arranged on them, has additional adjustment devices 27 and 28 for axial adjustment of two internal mandrels extending into the ends of the combustion chamber tube 1, each with an inner support mandrel 29 and 30 as backstop for shaping of the combustion chamber tube 1 from the outside and an outer shaping mandrel 31 and 32 for shaping of the combustion chamber tube 1 from the inside. The inner support mandrels 29 and 30 serve in the depicted embodiment as backstop for production of a bead and a surface of the outside, whereas the outer shaping mandrels 31 and 32 are used to produce an inner chamfer on the tube ends and for widening or sizing of the tube ends of the combustion chamber tube 1. Not only is an inner chamfer embossed on the two ends of the combustion chamber tube 1 by the two outer shaping mandrels 31 and 32 in the depicted embodiment, but the ends of the combustion chamber tube 1 are also widened somewhat and sized outwardly.

The left adjustment device 27 in FIG. 1 contains a slide 34 movable in the longitudinal direction of the combustion chamber tube 1 on a lower frame 33 with a horizontal support, which contains a rear part 35 and a forward protruding front part 36. A push sleeve 37 coaxial to the longitudinal axis of the combustion chamber 1 and a push rod 38 movable relative to it arranged in push sleeve 37 are arranged in the front part 36 of the horizontal support. A first closure sleeve 39 is also arranged on the free end of the front part 36 of the support stopping against the front face of the embossing dies 3. A clamping element 41 adjustable by means of a control cylinder 40 is situated on the rear part 35 of the support, through which the push rod 38 can be held in a front position via an operating rod 42 screwed into it or released for movement rearward. The first support mandrel 25 is fastened to the front end of push rod 38 and the first shaping mandrel 31 is fastened to the front end of push sleeve 37.

The right adjustment device 28 in FIG. 1 also contains a slide 44 movable in the longitudinal direction of the combustion chamber tube 1 on a lower frame 43 with horizontal support 45. A second closure sleeve 46 stopping against the rear face of embossing bodies 3, as well as the second support mandrel 30 and the second shaping mandrel 32, are arranged on the protruding front end of support 45.

It follows from FIG. 4 that the first support mandrel 29 is screwed into the front end of the push rod 38, whereas the first shaping mandrel 31 is screwed into the front end of the push sleeve 37. The second support mandrel 30 sits on a pin 47 screwed into the front end of the second shaping mandrel 32 and is forced against the head 49 of pin 47 by a spring 48. The second closure sleeve 46 is forced against the inner face of the embossing dies 3 by spring-loaded pins 50. The embossing dies 3 are fastened on the front faces via screws 51 to support plate 25.

Production of the combustion tube 1 is explained below with reference to FIGS. 4 to 6.

In a first process step, the two inner support mandrels 29 and 30 are pushed with the two outer shaping mandrels 31 and 32 into the position depicted in FIG. 4 via the two slides 34 and 44 with the embossing dies 4 still opened. The two inner support mandrels 29 and 30 are situated in the desired embossing position, whereas the two shaping mandrels 31 and 32 are only slightly introduced into the two ends of the combustion chamber tube 1. The embossing dies 3 have corresponding protrusions 52 and 53 on their interiors and the support mandrels 29 and 30 have recesses 54 and 55 on their exteriors pertaining to the protrusions 52 and 53.

In a next step, the embossing dies 3 provided with protrusions 52 and 53 are brought together against the support mandrels 29 and 30 according to FIG. 5 with the corresponding recesses 54 and 55, in which case a bead 56 and a surface 57 is produced on the combustion chamber tube 1. When the embossing dies 3 are brought together, the push rod 38 with the first support mandrel 29 arranged on it is held by the clamping element 41 pushed into a lower holding position via the control cylinder 40, so that the support mandrel 29 cannot back away through the force of the embossing dies 4. The second support mandrel 30 is held in its position by the force of spring 48. In a subsequent step, the two shaping mandrels 31 and 34 are then advanced according to FIG. 6. The first shaping mandrel 31 is pushed further into the combustion chamber tube 1 by a control movement of the first slide 34 via the push sleeve 37 supported on the rear part of the support, in which case the wedge-like clamping element 41 is moved into a raised release position via the control cylinder 29, so that the first shaping mandrel 31 arranged on the first slide 34 can be held in its position by the push rod 38 with the front support mandrel 31. An inner chamfer is thereby embossed on the front end of the combustion chamber tube 1. The front end of the combustion chamber tube 1 is also sized outwardly. At the same time, the second shaping mandrel 32 is pushed further into the combustion chamber tube 1 by an adjustment movement of the second slide 44, so that an inner chamfer is also embossed on the rear end of the combustion chamber tube 1 and the rear end is size outwardly. The second embossing mandrel 30 is held in its position by the embossing dies 4, spring 48 being compressed.

In a subsequent processing step, the combustion chamber tube 1 can be punched by a punching die with a cutting sleeve extending into the combustion chamber tube and several cutting punches arranged stellate around the combustion chamber tube and radially movable in a guide sleeve. Here again, the cutting punches arranged uniformly around the combustion chamber tube can be simultaneously moved, for example, by a ring press module with punches 3 movable in synchronized fashion in the radial direction and arranged around the combustion chamber tube 1, so that self-centering and precise machining is made possible.

LIST OF REFERENCE NUMERALS

1 Combustion chamber tube
2 Frame
3 Punch
4 Embossing guide
5 Rear guide plate
6 Front guide plate
7 Reciprocating link
8 Bearing arrangement
9 Annular bottom part
10 Arm
11 Motor
12 Shaft
13 Eccentric drive pin
14 Annular control element
15 Driver
16 Return spring
17 Guide element
18 Oblique control surfaces
19 Spacer sleeve
20 Compression element
21 Oblique surface
22 Clamp-like holding element
23 Holding tab
24 Holding groove
25 Support plate
26 Mount
27 Adjustment device
28 Adjustment device
29 First support mandrel
30 Second support mandrel
31 First shaping mandrel
32 Second shaping mandrel
33 Lower frame
34 Slide
35 Rear part of a support
36 Front part of a support
37 Push sleeve
38 Push rod
39 First closure sleeve
40 Control cylinder
41 Clamping element
42 Operating rod
43 Lower frame
44 Slide
45 Support
46 Second closure sleeve
47 Pin
48 Spring
49 Head
50 Pin
51 Screw
52 Protrusion
53 Protrusion
54 Recess
55 Recess
56 Bead
57 Surface

What is claimed is:

1. A device for production of a combustion chamber tube for restraint systems in vehicles, the device comprising:
    a ring press module with a plurality of punches arranged around the combustion chamber tube and movable in synchronized fashion in a radial direction by a control element;
    a first inner punch extending into a first end of the combustion chamber tube, the first inner punch having a first support mandrel and a first shaping mandrel movable relative to the first support mandrel;
    a second inner punch extending into a second end of the combustion chamber tube, the second inner punch having a second support mandrel and a second shaping mandrel movable relative to the second support mandrel;
    a first adjustment device for axial displacement of the first inner punch; and a second adjustment device for axial displacement of the second inner punch.

2. The device according to claim 1, wherein each of the plurality of has a corresponding embossing die releasably held to the corresponding punch by a corresponding holding element.

3. The device according to claim 1, wherein the first adjustment device contains a first slide movable on a first lower frame in a longitudinal direction of the combustion chamber tube with a first horizontal support, on which the first support mandrel and the first shaping mandrel are arranged.

4. The device according to claim 3, wherein the first horizontal support arranged on the first slide contains a rear part and a protruding front part, in which a push sleeve coaxial to a longitudinal axis of the combustion chamber tube is arranged for displacement of the first shaping mandrel and a push rod is arranged within the push sleeve for displacement of the first support mandrel.

5. The device according to claim 3, wherein the second adjustment device contains a second slide movable on a second lower frame in the longitudinal direction of the combustion chamber tube with a second horizontal support arranged on the second slide, and wherein the second horizontal support carries on a front end the second shaping mandrel and the second support mandrel movable relative to shaping mandrel.

6. The device according to claim 5, wherein the second support mandrel sits on a pin screwed into a front end of the second shaping mandrel and is forced against a head of the pin by a spring.

7. The device according to claim 1, wherein the control element is rotatable intermittently by a reciprocating link driven by an eccentric drive for radial displacement of the plurality of punches.

8. The device according to claim 7, wherein the reciprocating link contains an annular bottom part rotatable via a bearing arrangement and an upward protruding arm for engagement with an eccentric drive pin of a shaft of an eccentric drive.

9. The device according to claim 2, wherein each of the corresponding embossing dies is arranged on a common support plate.

10. The device according to claim 2, further comprising an additional ring press module with several cutting punches arranged around the combustion chamber tube and movable in synchronized fashion in the radial direction in a guide sleeve.

11. A method for production of a combustion chamber tube for restraint systems in vehicles, the method comprising:
inserting at least a portion of a first inner punch into a first end of the combustion chamber tube, the first inner punch having a first support mandrel and a first shaping mandrel movable relative to the first support mandrel;
inserting at least a portion of a second inner punch into a second end of the combustion chamber tube, the second inner punch having a second support mandrel and a second shaping mandrel movable relative to the second support mandrel;
embossing the combustion chamber tube with a plurality of embossing dies arranged stellate around the combustion chamber tube and movable by a ring press module in a radial direction against the first and second support mandrels into a closed position;
shaping the first and second ends of the combustion chamber tube with the first and second shaping mandrels by inserting the at least a portion of a first inner punch and the at least a portion of the second inner punch further into the first and second ends of the combustion chamber when the embossing dies are in the closed position.

12. The method according to claim 11, wherein the first and second support mandrels are moved into an embossing position by an adjustment device before the plurality of embossing dies are brought together and the first and second shaping mandrels are moved relative to the support mandrels after the plurality of embossing dies are moved in the closed position.

13. The method according to claim 11, further comprising punching the combustion chamber tube with a punching die with a cutting sleeve extending into the combustion chamber tube and a plurality of cutting punches arranged stellate around the combustion chamber tube and movable radially in a guide sleeve.

14. The method according to claim 13, wherein the plurality of cutting punches are moved back and forth by an additional ring press module.

* * * * *